United States Patent [19]

Mercer, Jr.

[11] 4,148,369

[45] Apr. 10, 1979

[54] VEHICLE WEIGHING SYSTEM TRANSDUCER

[75] Inventor: Alfred R. Mercer, Jr., Bellevue, Wash.

[73] Assignee: Structure Instrumentation, Inc., Tukwila, Wash.

[21] Appl. No.: 833,980

[22] Filed: Sep. 16, 1977

[51] Int. Cl.$^2$ ............................................. G01G 19/12
[52] U.S. Cl. ....................................... 177/136; 73/781; 177/211; 338/6
[58] Field of Search ....................... 177/136, 137, 211; 33/147 D, 148 D; 73/88.5; 338/6

[56] References Cited

U.S. PATENT DOCUMENTS

| 3,082,621 | 3/1963 | Soderholm | 73/88.5 X |
| 3,158,939 | 12/1964 | Brooks | 73/88.5 X |
| 4,020,681 | 5/1977 | O'Brien | 33/147 D X |
| 4,042,049 | 8/1977 | Reichow | 177/137 |

*Primary Examiner*—Joseph W. Hartary
*Attorney, Agent, or Firm*—Seed, Berry, Vernon & Baynham

[57] ABSTRACT

A transducer for measuring the load of a vehicle employing an equalizing beam suspension. In an equalizing beam suspension a pair of tandem wheels are supported by opposite ends of a pair of transversely spaced, center-mounted equalizing beams. Each equalizing beam carries one of the transducers which measures the deflection of the respective equalizing beam responsive to vehicle loading. The transducer includes a push rod clamped to the equalizing beam and extending into a measurement block which is clamped to a different point on the equalizing beam. The measurement block contains a strain gauge instrumented cantilever beam against which the motion transmitting bar abuts. Consequently, the cantilever beam deflects responsive to movement of the motion transmitting bar toward and away from the measurement block produced by load induced deflections of the equalizing beams. The measurement block is essentially a plurality of stacked plates, one of which forms the cantilever beam. Two plates positioned on opposite faces of the cantilever beam plate contain cutouts for providing deflection clearance for the cantilever beam. A second pair of plates positioned toward the motion transmitting bar each contain an aperture through which the motion transmitting beam passes. The aperture through the inside plate loosely contacts the motion transmitting beam to prevent transverse movement thereof, and the aperture through the outside plate contains an O-ring seal for protecting the cantilever beam and strain gauge from dirt and moisture.

4 Claims, 5 Drawing Figures

VEHICLE WEIGHING SYSTEM TRANSDUCER

BACKGROUND OF THE INVENTION

1. Field of the Invention

This invention relates to position measuring transducers, and, more particularly, to a transducer for measuring deflection of an equalizing beam employed in an equalizing beam suspension system.

2. Description of the Prior Art

Weight regulations limiting the load weights of commercial vehicles are almost universally in effect. These regulations generally specify the maximum load of each vehicle axle as well as the maximum total load. Fines are usually levied against operators who are found violating these regulations.

To maximize profits, vehicle operators normally load their vehicles as close as possible to the legal load limit. In order to do this, the vehicle operator must be able to accurately measure the vehicle's weight while the vehicle is being loaded.

Although measuring devices external to the vehicle such as platform scales have long been used for this purpose, recently developed on-board weighing systems have proved their usefulness over such external measuring devices. In some of these systems, strain gauges are generally secured to structural members of the vehicle, usually the axles. In other systems load cells are placed on structural members intermediate the axles and the load such as on the structural member supporting the vehicle bed. Other on-board load measuring systems measure the relative displacement of the springs or the relative displacement between the vehicle frame and axle.

Many problems associated with the above-mentioned on-board vehicle weighing systems have been solved to some extent by a recently developed system described in U.S. Pat. No. 4,042,049. This patent describes an on-board load measuring system which measures the deflection of a pair of transversely spaced, center-mount equalizing beams which are in turn supported at opposite ends by a pair of tandem axles. The transducer for measuring load-induced deflections of the equalizing beams is formed by a strain gauge instrumented measuring beam extending between a pair of mounting pads. The load cell is installed by boring accurately located mounting holes into the equalizing beam, tapping the bores with threads and then bolting the mounting blocks onto the equalizing beam utilizing the threaded bores. Although this system represents a vast improvement over conventional on-board vehicle weighing systems, some problems with the load cell mounting structure have nevertheless arisen. One of these problems is the difficulty in accurately spacing the holes apart from each other so that their position corresponds to the position of mounting bores in the respective mounting blocks. Any deviation from this exact placement prestresses the measuring beam thereby producing an offset in the output of the load cell. Another problem with the mounting structure is that the relatively large force required to bend the measurement beam necessitates that the measurement beam be bolted to the equalizing beam. However, by tapping into the equalizing beam, the distributors of such measuring systems potentially subject themselves to product liability claims in the event of equalizing beam failure. Although there has been no evidence that tapping into an equalizing beam in this manner reduces the strength of the equalizing beam the possibility nevertheless may give rise to unsubstantiated product liability claims.

SUMMARY OF THE INVENTION

The principal object of the invention is to provide a transducer which may be installed on an equalizing beam without tapping into the equalizing beam.

It is another object of the invention to provide a transducer which is capable of accurately measuring deflection of the equalizing beam.

It is still another object of the invention to provide a transducer which will be extremely accurate even where the transducer is installed on the equalizing beam without a great deal of precision.

It is still a further object of the invention to provide a transducer which is relatively inexpensive to manufacture and is extremely rugged.

These and other objects of the invention are accomplished by clamping a transducer having a low force characteristic to the equalizing beam. The low force characteristic of the transducer allows the transducer to be securely fastened to the equalizing beam by clamping thereby making it unnecessary to tap into the beam. The transducer includes two spaced apart portions, one of which receives a push rod projecting from the other transducer portion. In the measurement portion, the push rod extends through an O-ring seal and a guide hole, and its end abuts a cantilever beam instrumented with strain sensing means. As the equalizing beam deflects the two spaced apart portions of the transducer move toward and away from each other thereby causing the push rod to deflect the cantilevered measurement beam. The strain sensing means produce an output indicative of the magnitude of the load induced deflection of the equalizing beam.

DETAILED DESCRIPTION OF THE PREFERRED EMBODIMENTS

Figure 1:
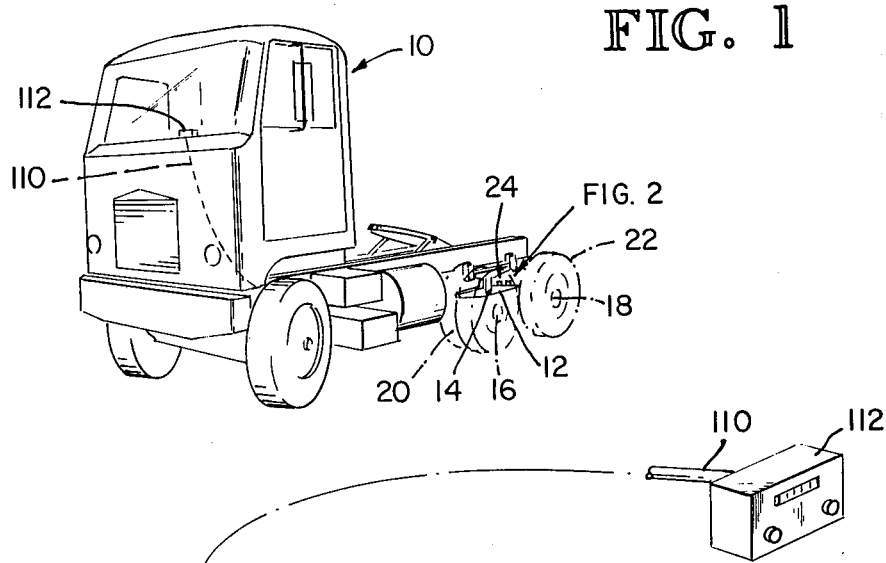
FIG. 1 is an isometric view showing the load measuring system installed on a vehicle utilizing an equalizing beam suspension system.

The on-board vehicle load measuring system of the present invention is illustrated in FIG. 1 installed on a vehicle having an equalizing beam suspension system. The equalizing beam suspension system is described in detail in U.S. Pat. No. 2,914,349. Basically, it consists of a pair of transversely spaced equalizing beams 12 secured to the vehicle by a center pivot 14. The forward and rear ends of the equalizing beam 12 are connected to the front and rear axles 16, 18, respectively, of the vehicle 10. The principal advantage of the equalizing beam suspension system is that displacements of either wheel 20, 22 are attenuated by 50% before being transmitted to the vehicle 10 through the center pivot 14. This feature, in addition to the ruggedness of such suspensions, has accounted for the widespread use of the equalizing beam suspension system. Since the equalizing beams 12 bend or deflect as the vehicle 10 is loaded, the degree of deflection is a measure of the load 10 carried by the vehicle. Consequently, a deflection transducer 24 secured to the upper rear surfaces of the equalizing beams 12 is able to provide an indication of the load carried by the vehicle 10.

Figure 2:
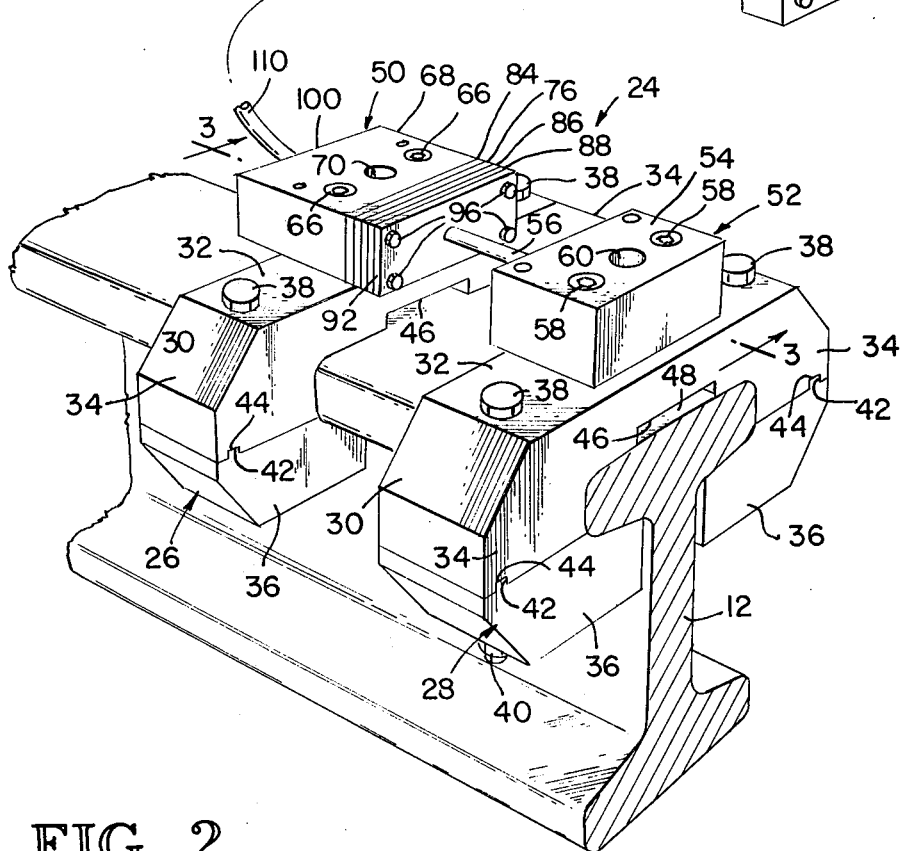
FIG. 2 is an isometric view showing the load measuring system installed on an equalizing beam.

The deflection transducer 24 is shown installed on the equalizing beam 12 in FIG. 2. In order to prevent any possible weakening of the equalizing beam 12, it is desirable to clamp the deflection transducer 24 onto the beam 12 rather than tapping threads into the equalizing beam as with the load measuring system described and claimed in U.S. Pat. No. 4,042,049. However, clamping a transducer to the equalizing beam 12 will not function adequately unless the force characteristics of the transducer are sufficiently low so that the clamps do not slip responsive to deflection of the equalizing beam 12. The deflection transducer 24 illustrated in FIG. 2 satisfies these requirements so that the transducer 24 can accurately measure load-induced deflections of the equalizing beam 12 without requiring that holes be formed in the equalizing beam 12. The transducer 24 includes a pair of clamps 26, 28 which are substantially identical to each other. Each clamp 26, 28 includes a generally U-shaped top portion 30 comprising a center leg 32 and a pair of side legs 34 extending along the sides of the equalizing beam 12. The side legs 34 are secured to inwardly facing clamp members 36 which extend under the top flange of the generally I-shaped equalizing beam 12. The clamp portions 36 are drawn toward the center legs 32 by bolts 38 which extend through the clamp portions 36 and engage respective nuts 40 on the lower surface of the clamp members 36. A lengthwise projecting portion 42 of each clamp member 36 fits into respective slots 44 on the side legs 34 to prevent movement of the clamp members 36 away from the equalizing beam.

The equalizing beam 12 tapers inwardly from the center pivot 14 (FIG. 1) toward the ends. Consequently the sizes of the U-shaped cutoutd for the forward and rear U-shaped top portions 30 are different. Also, the inside surface of the outer legs 34 of the clamp members 30 are tapered to match the taper of the equalizing beam 12. The clamps 26, 28 are slid along the equalizing beam 12 until the inside surfaces of the clamp outer legs 34 abut the sides of the equalizing beam 12.

Each center leg 32 of the U-shaped top portions 30 contain a rectangular, longitudinal slot 46 for providing clearance between the center leg 32 and a longitudinal seam 48 which runs along the length of the equalizing beam 12.

Figure 3:
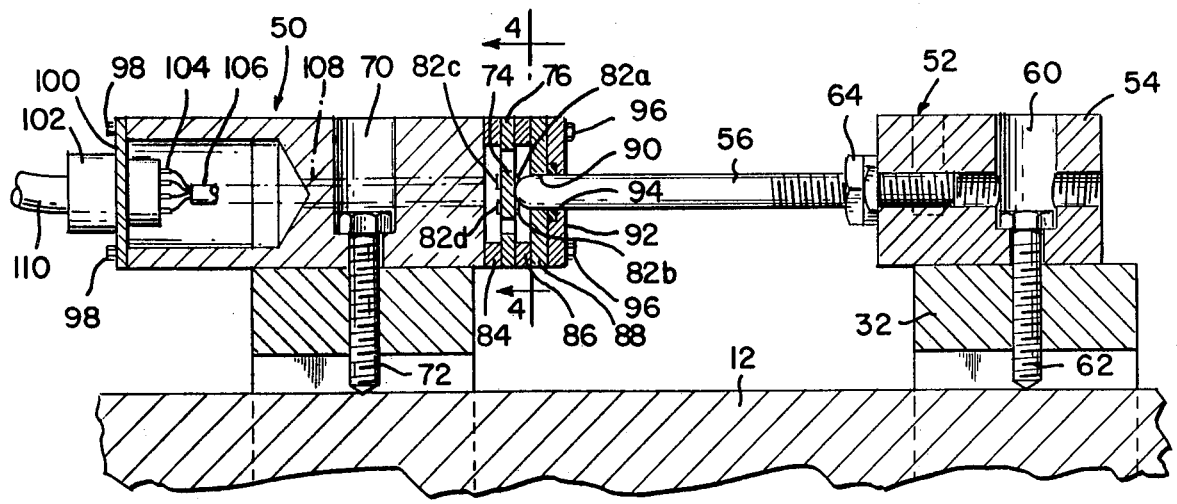
FIG. 3 is a cross-sectional view taken along the line 3-3 of FIG. 2.

The center legs 32 of the generally U-shaped top portions 30 form mounting pads for two transducer sections 50, 52. With reference also to FIG. 3, the transducer section 52 closest to the end of the equalizing beam 12 is basically a rectangular block 54 having a push rod 56 projecting toward the transducer section 50. The block 54 is secured to the mounting pads of the center leg 32 by bolts 58 extending into respective threaded bores in the center leg 32. A through bore 60 positioned in the center of the block 52 allows access to a set screw 62 threaded in the center leg 32 of the top portion 30. The set screw 62 has a conical end which is slightly inserted into the equalizing beam 12 to prevent shifting of the clamp 28.

As best illustrated in FIG. 3, the push rod 56 is threaded into the block 54, and a jamb nut 64 is torqued against the forward surface of the block 54 in order to prevent inadvertent rotation of the rod 56. As explained hereinafter, the push rod 56 is rotated in the block 54 to adjust the length of the push rod 56 thereby eliminating output offsets from the transducer.

The forward transducer section 50 is to clamp 26 in the same manner that transducer section 52 is secured to clamp 28. A pair of bolts 66 extend through a transducer block 68 to engage threaded bores in the center leg 32 of the clamp 26. A bore 70 extending through the block 68 allows access to a set screw 72 having a conical end which is threaded in the center leg 32 of the clamp 26 to prevent longitudinal movement of the clamp 26.

Figure 4:
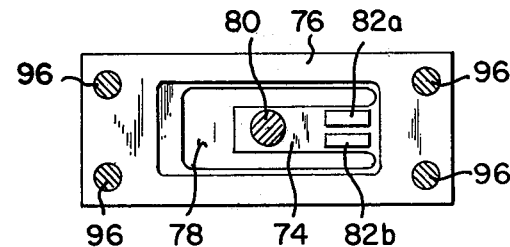
FIG. 4 is a cross-sectional view taken along the line 4-4 of FIG. 3.

The projecting end of the push rod 56 abuts a cantilever beam 74 formed in a plate 76 as illustrated also in FIG. 4. The cantilever beam 74 is fabricated by forming a generally U-shaped cutout 78 in the plate 76. A contact point between the cantilever beam 74 and the push rod 56 is indicated at 80, and conventional strain gauges 82 are secured to the cantilever beam 74 adjacent the attachment point of the beam 74 to the plate 76. The cantilever beam plate 76 is positioned between a pair of spacer plates 84, 86 which are basically rectangular plates having a central rectangular cutout to provide clearance for deflection of the beam 74. A guide plate 88 contains a cylindrical bore 90 through which the push rod extends 56. The cylindrical bore 90 has a diameter slightly larger than the diameter of the push rod 56 so that the bore 90 prevents transverse movement of the push rod 56 which would alter the contact point 80 between the push rod 56 and cantilever beam 74. An end plate 92 contains a relatively large cylindrical cutout which receives an O-ring seal 94 through which the push rod extends 56. The O-ring seal 94 loosely contacts the outer surface of the push rod 56 in order to prevent moisture and dirt from reaching the centilever beam 74.

All of the plates 76, 84, 86, 88, 92 are secured to the block 68 by bolts 96 which extend through the block 50 to engage nuts 98 which secure an end plate 100 to the block 68. The end plate 100 carries a connector 102 which extends into a cylindrical bore 104 in the block 68. Leads 106 extend from the connector 102 through a cylindrical bore 108 to the strain gauges 82. A cable 110 connects the strain gauges 82 to a processing and display device 112 (FIG. 2) mounted in the cab of the vehicle 10.

The length of the push rod 56 is adjusted by rotating the push rod 56 in the block 54 so that the end of the push rod 56 is just contacting the cantilever beam 74 when the vehicle 10 is in its unloaded condition. This adjustment capability reduces the precision required to install the transducer compared to previously used equalizing beam transducers.

Figure 5:
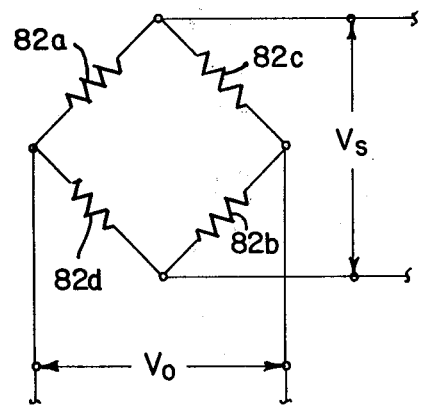
FIG. 5 is a schematic illustrating the manner in which the strain gauges installed on the cantilever beam are connected.

When the vehicle is loaded, the equalizing beams 12 deflect so that the transducer portions 50, 52 move toward each other. Consequently, the cantilever beam 74 deflects toward the left as viewed in FIG. 3 so that the strain gauges 82a,b undergo tension while the strain gauges 82c,d undergo compression. Thus the resistances of strain gauges 82a,b increase, while the resistances of strain gauges 82c,d decrease, responsive to vehicle loading. The strain gauges 82 are connected as illustrated in FIG. 5 in a conventional bridge arrangement so that for a constant supply voltage vs the transducer output voltage $V_0$ increases accordingly.

The relatively easy deflection of the centilever beam 74 results in a relatively low force characteristic of the deflection transducer so that the clamps 26, 28 are easily able to prevent longitudinal movement along the equalizing beam 12 responsive to load induced deflections of the beam 12. The multiplate construction of the measurement portion 50 allows the unit to be manufactured at a relatively low cost, and it provides a structure which is resistant to damage from environmental conditions such as shock, dirt and moisture. Thus the inventive transducer is able to accurately measure deflection of structural members such as equalizing beams without otherwise altering the structure of the equalizing beam.

I claim:

1. In an on-board load measuring system for a vehicle having a pair of transversely spaced, center mounted equalizing beams supported at opposite ends by forward and rear axles, each of said beams being tapered inwardly from the center of said beam toward the ends thereof, transducer means for measuring load induced deflection of said equalizing beams comprising:

first and second mounting pads including means for clamping said mounting pads to said equalizing beam at spaced apart points thereof, said clamping means straddling said beam with the inner surfaces of the straddling portion tapered to match the taper of said equalizing beam such that the position of said positioning measure means along the length of said equalizing beam is fixed when the inner surfaces of the straddling portions abut the outer lateral surface of said equalizing beam; and position measuring means carried by said pads for measuring the displacement of said pads toward and away from each other responsive to deflection of said equalizing beam.

2. The load measuring system of claim 1 wherein said equalizing beam is generally I-shaped in cross section, and wherein clamp means comprise:

first and second, spaced apart, generaly U-shaped members with the center leg of said U-shaped members carrying said first and second mounting pads, respectively, and the outer legs of said U-shaped members extending along the lateral faces of said equalizing beam, said outside legs terminating in respective clamp members projecting inwardly to enclose a flange of said equalizing beam between the center legs of said U-shaped members and said clamp members, said clamp means further including means for urging said clamp members toward respective U-shaped members to foreceably grip said equalizing beam.

3. In an on-board load measuring system for a vehicle having a pair of transversely spaced, center mounted equalizing beams supported at opposite ends by forward and rear axles, transducer means for measuring load induced deflection of said equalizing beams comprising:

first and second mounting pads including means for clamping said mounting pads to said equalizing beam at spaced apart points thereof; and position measuring means carried by said pads for measuring the displacement of said pads toward and away from each other responsive to deflection of said equalizing beam, said position measuring means including:

a push rod projecting from said second mounting pad toward said first mounting pad;

a mounting block secured to said first mounting pad; a first plate having an open center positioned against said mounting block facing toward said second mounting pad;

a second plate positioned against said first plate away from said mounting block, said second plate having a generally open center and a cantilever beam projecting into said open center with said cantilever beam abutting the projecting end of said push rod;

a third plate having an open center positioned against said second plate away from said mounting block;

a fourth plate positioned against said third plate away from said mounting block, said fourth plate having a through bore loosely surrounding said push rod to prevent transverse movement of said push rod; and a fifth plate positioned against said fourth plate away from said mounting block, said fifth plate having a through bore substantially larger than the transverse dimension of said push rod with said bore carrying an O-ring seal loosely contacting said push rod to shield said push rod from externally located dirt and moisture.

4. A transducer for measuring deflection of a structural member, comprising:

first and second, spaced apart mounting blocks secured to said structural member;

a push rod extending from said second mounting block toward said first mounting block;

a first spacer plate having an open center secured to a surface of said first mounting block facing toward said second mounting block;

a cantilever beam plate positioned against said first spacer plate away from said mounting block, said cantilever beam plate having a generally open center and a cantilever beam projecting into said open center with said cantilever beam abutting the projecting end of said push rod;

a second spacer plate positioned against said cantilever beam plate away from said first mounting block, said spacer plate having an open center adapted to allow deflection of said cantilever beam therethrough;

a guide plate positioned against said second spacer plate away from said first mounting block, said guide plate having a through bore loosely surrounding said push rod to prevent transverse movement of said push rod; and a sealing plate positioned against said guide plate away from said first mounting block, said sealing plate having a through bore substantially larger than the transverse dimension of said push rod with said bore carrying an O-ring seal loosely contacting said push rod.

* * * * *